United States Patent Office 2,974,033
Patented Mar. 7, 1961

2,974,033
MELTING TITANIUM METAL

Robert J. Krieger, Henderson, Nev., assignor to Titanium Metals Corporation of America, Pittsburgh, Pa., a corporation of Pennsylvania No Drawing. Filed June 7, 1954, Ser. No. 435,046

3 Claims. (Cl. 75—10)

This invention relates to melting of refractory metals particularly titanium metal.

Titanium metal as commercially produced by the so called Kroll process, or other methods, generally consists of discrete particles of varying size often referred to as sponge, crystals or powder. The particles must be consolidated into massive form to be useful for the production of fabricated products and this is accomplished by melting the sponge or powder into ingots. During the melting operations other metallic ingredients may be added to produce an ingot of titanium alloy possessing required metallurgical and physical characteristics. Due to the refractory nature of titanium (melting point about 1800° C.) arc melting has been most often employed and consumable electrodes fabricated by compacting powder or sponge are preferred, to avoid contamination of the product metal with electrode material. Previously known and used methods for melting titanium have been carried out in the presence of an inert atmosphere because of the propensity of titanium for combining with oxygen and nitrogen at elevated temperatures. Arc melting furnaces have comprised sealed vessels with appropriate electrical and mechanical mechanisms and containing argon gas generally at slightly above atmospheric pressure to prevent ingress of air should the furnace structure tend to leak. Several disadvantages have been attendant upon such operations. The presence of argon at atmospheric or higher pressure has resulted in poor arc conditions. It has been found that the arc is erratic and unstable, short circuits between the electrode and the molten pool of ingot metal occur periodically and the violence of the melting process throws and spatters metal about in the melting chamber particularly on to the walls of the melting crucible. As a result the ingot formed shows a very rough surface and often up to 20% or more of the ingot weight must be machined off before a satisfactory, dense, uniform billet, with smooth surface necessary for further processing, can be obtained. In addition the purity of the melted ingot is invariably poorer than the original starting metal and it is postulated that normally insignificant amounts of moisture in the argon gas contribute to this effect.

It is therefore the object of this invention to provide an improved method for melting titanium metal. Another object is to provide a method for melting and simultaneously purifying titanium metal. Still another object is to provide a method for melting titanium metal to form more uniform ingots of improved characteristics. Yet another object of the invention is to provide a more, convenient and economical method of melting titanium metal to form ingots. These and other objects of this invention will be apparent from the following detailed description thereof.

This invention in its broadest aspects contemplates melting titanium metal employing the metal to be melted as a consumable electrode in an arc furnace and conducting the melting at a reduced pressure of between 0.5 and 5 mm. of mercury absolute, preferably in an atmosphere of the gas evolved from the metal being melted. The gas pressure inside the melting furnace is of critical importance. If a pressure of above 5 millimeters is maintained the arc stability is generally poor and the surface and physical qualities of the ingot are adversely affected and in addition removal of volatile impurities such as hydrogen from the metal is not satisfactorily accomplished. If the pressure is maintained below about 0.5 millimeter, control of the arc becomes much more difficult, there is a danger of appreciable volatilization of alloying ingredients when these are added to form various alloys, the melting rate is reduced and the efficiency of the current used is seriously lowered.

The gases evolved from titanium sponge or powder when melted according to this invention will principally be hydrogen, and magnesium and magnesium chloride vapors. Employing a well constructed, tight furnace the in-leakage of oxygen and nitrogen from the air will generally be negligible and the amount present in the furnace atmosphere will be insignificant. Hydrogen is evolved readily at the temperatures and pressures employed and is almost always present in titanium sponge in appreciable quantities particularly if this material has been produced by reduction of titanium tetrachloride with metallic magnesium and the reaction products (magnesium chloride and metallic titanium) have been separated by leaching. The pressure in the melting chamber is maintained at the proper level by connection thereto in known manner a suitable vacuum pumping or evacuating system or preferably a plurality of pumps so that proper control of residual pressure in the melting furnace may be obtained by adjustment of the pumping capacity.

The following example is shown as an illustration of the practice of this invention.

EXAMPLE I

An arc furnace was employed which comprised an electrode housing containing electrically controlled mechanical means for lowering a compacted electrode formed of titanium sponge into a subtended water cooled copper crucible. The titanium sponge contained the following impurities:

| | Percent |
|---|---|
| C | .03 |
| N | .02 |
| O | .22 |
| H | .02 |
| Mg | .35 |
| Cl | .12 |

Sufficient alloying metals were incorporated into the compacts to produce an alloy containing 1.5% Fe, 1.5% Cr, 1.1% Mo and 7.25% Al. The furnace chamber was connected to a vacuum pumping system of 400 cu. ft. per minute capacity. A small amount of loose sponge was placed in the crucible bottom, the furnace closed and sealed and the entire furnace chamber was evacuated to about 0.3 mm. Current was applied between the electrode and the copper crucible at 30 volts and 10,000 amperes to strike an arc between the bottom of the electrode and the sponge in the bottom of the crucible in order to initiate melting. The vacuum pumps were kept running and immediately on striking the arc the pressure in the furnace rose to 2.1 millimeters as indicated by a Stokes McLeod gage arranged to communicate with the furnace interior. The amperage was maintained at 10,000 amps. for the principal period of the melt. The electrode lowering mechanism was operated electrically and automatically to maintain an arc voltage of 30 volts so that the electrode was gradually melted and transferred progressively into an ingot in the crucible. After a two hour melting period the electrode was, for all practical purposes, completely consumed, only the residual stub used for attaching to the controlling mechanism remaining. During the entire melting period the vacuum pumps were pumping and a log of the pressure in the furnace showed the following:

Table 1

| Time | Amperage, amps. | Pressure, mm. |
|---|---|---|
| 0 (start arc) | 10,000 | 2.1 |
| 15 mins | 10,000 | 1.9 |
| 30 mins | 10,000 | 2.2 |
| 1 hr | 10,000 | 1.8 |
| 2 hrs | 10,000 | 1.6 |
| 2 hrs 30 min | shut off | 1.0 |

After shutting off the power the vacuum system was kept in operation for ½ hour to remove as much as possible of residual gases and then the furnace was flooded with argon gas at 5 lbs. above atmospheric pressure and the ingot allowed to cool in the argon atmosphere before removal.

The ingot produced showed a smooth outer surface and the absence of a ring of spatter material on top which is characteristic of ingots melted under an argon atmosphere. It required the removal of only 9% of its weight to produce an ingot free from surface imperfections and suitable for forging or other fabrication treatment. An ingot melted in the same furnace from similar sponge under argon at slightly above atmospheric pressure required removal of 21.6% of its weight to produce a clear surface ingot. Substantially no alloying ingredients were lost from the ingot which analyzed as follows:

Fe—1.46%
Cr—1.55%
Mo—1.14%
Al—7.26%
C—.03%

N—.02%
O—.22%
H—.007%
Mg—trace
Cl—.025%

The impurity content of the titanium had been substantially reduced particularly the hydrogen, magnesium and chlorine contents. It is significant that the oxygen and nitrogen content was not increased by the melting operation as almost always occurs when melting under argon atmosphere.

In order to provide greatest homogeneity in the finished ingot double melting is often employed, that is, the ingot produced in the first melting step is employed as the consumable electrode in a second melting step. When melting according to the process of this invention the major portion of the impurities will be removed in the first melting step but the valuable other advantages are obtained when an ingot electrode is remelted. The melting operations are smooth with a stable arc and the ingot surface and soundness shows a substantial difference and improvement over that which would be obtained when melted under argon or other inert gases at atmospheric or higher pressure. Since the volume of gases evolved from the ingot electrode metal will not be as great as in the first melting step some adjustment of vacuum pumping capacity may have to be made to keep the pressure in the furnace within the desired limits according to this invention. It will often be found however that a pumping system arranged to provide proper pressures during original melting, within the higher part of the range according to this invention, for instance two to five millimeters of mercury, will, on remelting, provide pressures which, while substantially lower, for instance about 1 millimeter, will still be within the proper range.

An alternative method for controlling the pressure when remelting metal from which insufficient gas is evolved to maintain the desired residual pressure in the furnace, under conditions where pumping capacity cannot be readily varied or reduced, is to continue evacuation of the furnace during melting and simultaneously to admit a gas into the furnace at a rate to maintain the proper pressure therein. Preferably this gas should be selected from the group consisting of hydrogen, argon and helium and of these, best arc conditions will be obtained employing hydrogen. This will provide an atmosphere in the furnace approximately that which would be present if hydrogen were being evolved from the metal during melting.

Melting according to this invention at reduced pressure, that is below atmospheric pressure, should be distinguished from so-called vacuum melting wherein as low as possible pressure is obtained in the furnace, generally of the order of 100 microns or less. When the pressure in the furnace is reduced below about 500 microns the current efficiency and melting rate are adversely affected. For example Table 2 below compares the efficiencies and characteristics of operation according to this invention as embodied in Example 1 and a similar melt made at pressures below 500 microns.

Table 2

| | Melt of Example 1 | Similar Melt at Lower Pressure |
|---|---|---|
| Pressure in furnace | 1.0 to 2.2 mm | 250 to 400 microns. |
| Time of melt | 3 hrs. 35 min | 5 hrs. 10 min. |
| Melting rate | 17.7 lbs./min | 12.3 lbs./min. |
| Current | 10,000 amps | 10,000 amps. |
| Power used | .32 kw.-h./lb | .45 kw.-h./lb. |

Vacuum melting does not provide the proper atmosphere apparently essential for smooth arc control, and ingot surface and uniformity are not as good as when the melting operation is conducted according to this invention. Moreover, if the sponge or metal contains substantial amounts of volatilizable materials these may be released with explosive violence and poor melting conditions in the crucible result. Another disadvantage of vacuum melting is the danger of loss of alloying ingredients since, under high vacuum and at the temperature of the arc, even those elements normally considered stable may have an appreciable vapor pressure. This is avoided by the process of this invention, with respect to all but the commonly considered volatile alloying metals such as, for instance, manganese.

I claim:
1. A method for melting a metal containing volatilizable impurities selected from the group consisting of titanium and titanium base alloys which comprises arc melting said metal in the form of a consumable electrode in a furnace having the atmosphere therein composed substantially of impurity gases evolved from said metal during melting, maintained at a pressure of between 5 mm. and 0.5 mm. of mercury absolute.

2. A method for melting a metal containing hydrogen impurity selected from the group consisting of titanium and titanium base alloys which comprises arc melting said metal in the form of a consumable electrode in a furnace having the atmosphere therein composed principally of hydrogen evolved from said metal during melting maintained at a pressure of between 5 mm. and 0.5 mm. of mercury absolute.

3. A method for melting a metal containing volatilizable impurities selected from the group consisting of titanium and titanium base alloys which comprises arc melting said metal in the form of a consumable electrode in a furnace while withdrawing impurity gases evolved from said metal during melting at a rate to maintain a residual pressure of said gases in said furnace of between 5 mm. and 0.5 mm. of mercury absolute.

(References on following page)

References Cited in the file of this patent

UNITED STATES PATENTS

| | | |
|---|---|---|
| 2,541,764 | Herres et al. | Feb. 13, 1951 |
| 2,580,273 | Bens et al. | Dec. 25, 1951 |
| 2,702,239 | Gilbert et al. | Feb. 15, 1955 |
| 2,727,937 | Boyer | Dec. 20, 1955 |
| 2,768,074 | Strauffer | Oct. 23, 1956 |

OTHER REFERENCES

Transactions of the Electrochemical Society, vol. 96, No. 3, September 1949, pages 158–169. Article titled "Melting and Casting Zirconium Metal," by Kroll et al.